Patented Nov. 6, 1923.

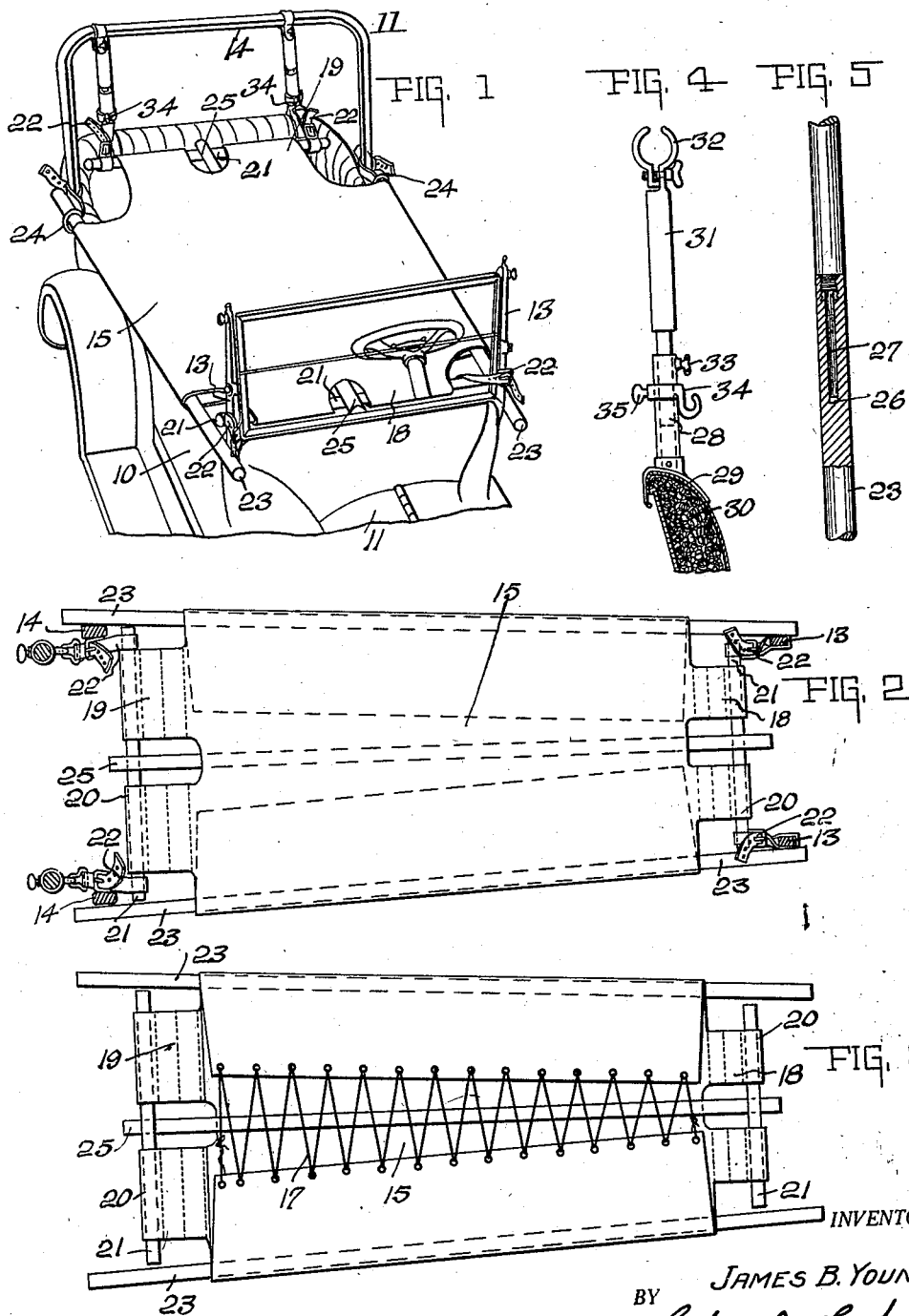

1,473,413

UNITED STATES PATENT OFFICE.

JAMES B. YOUNG, OF CUMBERLAND, INDIANA.

AUTOMOBILE BED.

Application filed August 11, 1922. Serial No. 581,099.

*To all whom it may concern:*

Be it known that I, JAMES B. YOUNG, a citizen of the United States, and a resident of Cumberland, county of Marion, and State of Indiana, have invented a certain new and useful Automobile Bed; and I do hereby declare that the following is a full, clear, and exact description thereof, reference being had to the accompanying drawings, in which like numerals refer to like parts.

This invention relates to a folding bed as equipment for an automobile, for use particularly in touring and camping.

The principal object of the invention is to provide a folding bed which is adapted to fit in an automobile, open or closed, which will be inexpensive to manufacture, of simple and strong construction, comfortable, and occupy a minimum of space when not in use. Its construction is such as to be readily assembled and mounted as a bed and quickly removed and put out of the way when not in use.

One feature of the invention resides in the manner of securing the bed upon the vehicle, employing parts of the vehicle for maintaining the bed in laterally stretched position, thereby eliminating the necessity of using lateral stretching bars and the like.

Another feature of the invention lies in the central longitudinal dividing rod for further supporting the structure and dividing it into a double bed for permitting two persons to rest upon it and prevent their being thrown together by the central sagging thereof.

Another feature of the invention resides in the universal construction whereby it may be adjusted to any size vehicle, either longitudinally or laterally, and the provision of collapsible supporting bars readily removable therefrom so as to be folded out of the way and permit the bed to be rolled up so as to take up a minimum of space when not in use.

The full nature of the invention will be understood from the accompanying drawings and the following description and claims.

In the drawings, Fig. 1 is a perspective view showing the bed in position upon the vehicle. Fig. 2 is a plan view of the bed showing its connection with parts of the vehicle, other parts being removed. Fig. 3 is a plan view of the under side of the bed. Fig. 4 is a detailed view of the rear supporting bracket. Fig. 5 is a detailed view of the collapsible longitudinal supporting rods.

In the drawings there is shown an automobile of the usual type having a body 10, hood 11, wind shield frame 13 and top bows 14. The bed consists of a body portion 15 formed of canvas or any suitable material adapted to be stretched over and supported above the seats of the vehicle between the sides and ends of the body thereof. The body portion 15 of the bed is provided with overlapping portions which are adapted to be laced together by the lacing string 17, as shown in Fig. 3. This is for the purpose of permitting the bed to be universal or adjustable to any width of vehicle. The ends of the body portion are cut away to provide a head 18 and a tail 19, said head and tail being provided with a plurality of stitched or otherwise secured folds or loops 20 for receiving the cross rod supports 21. The forward end or head of the bed is supported by suitable straps 22 secured to each end of the front rod 21 adapted to buckle over the wind shield frame 13, or be secured thereto in any suitable fashion, such as clips and rings fixedly secured thereon. The rear or tail rod is similarly secured to the back of the vehicle by means of a bracket mounting to be hereinafter described. This arrangement supports the bed at the front and rear in the nature of a hammock.

For stretching the bed laterally so as to maintain it substantially taut without the use of stretching bars, and to support the edges, there are provided longitudinally extending side bars 23 about which the body of the bed is folded, as shown in Fig. 2. The forward end of the side bars 23 extend past the upright member of the wind shield frame, so that said bars engage the outer surface thereof on each side of the wind shield. Therefore, the wind shield frame is utilized to separate said bars and maintain the front portion thereof in spaced relation to each other. The rear ends of the bars 23 are adapted to extend through suitable rings 24 which are strapped to the side bows 14 of the top frame. Said rings being in fixed position, maintain the rear ends of the bars 23 in spaced relation to each other. While the side bars in no way directly support the bed itself, they maintain it in stretched position and hold up the sides to prevent sagging. This arrangement, therefore, eliminates the necessity of having a fixed or integral four-sided frame which is undesirable in disposing of the bed when not in use.

In event it is desired that two persons rest upon the bed, a central longitudinal dividing bar 25 may be used, said bar being removably secured at each end to the end supporting bars 21. This bar is for the purpose of preventing sagging in the middle of the bed which would cause two persons to be rolled together and in substance forms two separate and individual sleeping portions.

The longitudinally extending rods 23 and 25 are so constructed as to be divided as shown in Fig. 5, for the purpose of disposing of them when not in use. In one-half of the bar there is provided a recess 26 which receives a projection 27 formed upon the other half so as to strengthen and make rigid the connection therebetween. The receiving half of the bar is provided with internal screw threads; while the other half is provided with a reduced portion about the projection 27 having external screw threads, so that said halves may be telescoped and then screwed into a rigid connection.

As shown in Fig. 4, there is provided a bracket having an adjustable hook thereon, to which the rear straps 22 are secured. Said bracket comprises a standard 28 having the bottom thereof curved with a downwardly projecting portion 29 so as to fit over the upholstery 30 of the rear seat. The projection 29 extends down the back of the seat; while the curved forward portion adjacent thereto embraces the top rounded portion of the upholstery. Adjustably mounted upon the standard 28, there is a post 31 which is provided with a clamp 32 adapted to embrace and be rigidly clamped to the rear top bow 14. After being properly adjusted for height and being clamped in position, the post 31 and the standard 28 are locked together by their interlocking portions and secured together by the set screw 33. Slidably mounted upon the post 31, there is a hook 34 which is fixed in adjusted position by the set screw 35. There is one of said brackets above described mounted on each side of the vehicle, so that the rear straps 22 can be suspended from the hooks 34.

After all adjustments are made of the supporting rods, the brackets, and the body of the bed to the particular size car upon which it is to be used, no further adjustment need be made. Therefore, after once having been used, this bed may be quickly mounted and removed from the car. After adjustment, to mount the bed, the canvas body portion 15 is unrolled and the straps secured to their respective supports at the front and rear which may be left in place. The longitudinal bars 23 may be quickly inserted through the side folds of the canvas so that the rear ends extend through the ring 24 and the front ends embrace the wind shield frame. The bed is then ready for use. If two persons are to use the bed, the central rod 25 may be inserted and secured to the end rods 21. When not in use, the side rods 23 are pulled out, unscrewed at their center, the bed is unstrapped at its ends, the rods 23 laid therein and the bed then rolled up in a compact roll to be stored away for future use.

The invention claimed is:

1. In combination with a vehicle having a front wind shield frame, and a top frame, of a collapsible bed adapted to be mounted therein comprising a body portion, means for supporting each end thereof upon said wind shield frame and top frame, and means held in spaced relation by said wind shield frame and top frame for supporting the sides of said bed, stretching it laterally and maintaining said sides in spaced relation.

2. An adjustable bed for vehicles comprising a body portion, a plurality of folds formed on each end of said body portion, end supporting rods adapted to extend through any one of said folds for varying the length of said bed, means for securing said rods to said vehicle, and means independent of said end supporting rods for supporting the sides thereof in spaced relation with each other.

3. In combination with a vehicle having a front wind shield frame, and a top frame, of a collapsible bed adapted to be mounted therein comprising a body portion, a detachable bracket mounted on the rear of said vehicle and secured to the top frame thereof, means for securing the forward end of said bed to the forward end of said vehicle, and means for detachably securing the rear end thereof to the bracket.

4. In combination with a vehicle having a front wind shield frame, and a top frame, of a collapsible bed adapted to be mounted therein comprising a body portion, a detachable bracket mounted on the rear of the vehicle and secured to the top frame thereof, means for securing the forward end of said bed to the forward end of the vehicle, means for detachably securing the rear end thereof to the bracket, and side supporting members for supporting the sides of said bed independently of the ends thereof adapted to be maintained in spaced relation with each other by engagement with said vehicle.

In witness whereof, I have hereunto affixed my signature.

JAMES B. YOUNG.